United States Patent
Brees et al.

(10) Patent No.: US 8,202,052 B2
(45) Date of Patent: Jun. 19, 2012

(54) THREE-PART STATOR BLADE

(75) Inventors: William Brees, Wooster, OH (US); Gregory A. Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1084 days.

(21) Appl. No.: 12/150,799

(22) Filed: May 1, 2008

(65) Prior Publication Data

US 2008/0279691 A1    Nov. 13, 2008

Related U.S. Application Data

(60) Provisional application No. 60/966,303, filed on Aug. 27, 2007, provisional application No. 60/928,437, filed on May 9, 2007.

(51) Int. Cl.
*F04D 29/44* (2006.01)
(52) U.S. Cl. .......... 416/23; 416/147; 416/161; 416/191; 416/197 C; 60/312; 60/365
(58) Field of Classification Search .................... 415/23, 415/62, 146, 147, 161, 166, 191; 416/180, 416/197 C; 60/312, 365
See application file for complete search history.

(56) References Cited

U.S. PATENT DOCUMENTS

| | | | | | |
|---|---|---|---|---|---|
| 1,760,397 | A | * | 5/1930 | Coats | 60/354 |
| 1,760,480 | A | * | 5/1930 | Coats | 60/345 |
| 2,162,543 | A | * | 6/1939 | Banner | 60/342 |
| 2,612,754 | A | * | 10/1952 | Swift | 60/346 |
| 3,354,643 | A | * | 11/1967 | Paredes | 60/354 |
| 3,385,060 | A | * | 5/1968 | Lazarus | 60/341 |
| 4,848,084 | A | * | 7/1989 | Wirtz | 60/342 |
| 2007/0224042 | A1 | | 9/2007 | Brees et al. | |

* cited by examiner

*Primary Examiner* — Igor Kershteyn
(74) *Attorney, Agent, or Firm* — Simpson & Simpson, PLLC (57) ABSTRACT

A blade for a stator in a torque converter, including: a first blade segment connected to an inner circumferential section of the stator; at least one second blade segment, separately formed from the first blade segment, and connected to the inner circumferential section; and a third blade segment, separately formed from the first and second blade segments, and connected to the inner circumferential section. In some aspects, the first, second, and third blade segments include respective outer radial portions and the outer radial portions are fixedly connected. In some aspects, the first and second blade segments are in contact and the second and third blade segments are in contact. In some aspects, the first, second, and third blade segments include respective edges and the first and second blade segments are in contact along the respective edges and the second and third blade segments are in contact along the respective edges.

13 Claims, 8 Drawing Sheets

THREE-PART STATOR BLADE

CROSS-REFERENCE TO RELATED APPLICATIONS

This application claims the benefit under 35 U.S.C. §119 (e) of U.S. Provisional Application No. 60/966,303 filed Aug. 27, 2007 and U.S. Provisional Application No. 60/928,437 filed on May 9, 2007, which applications are incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter stator blade with three-separately formed segments.

BACKGROUND OF THE INVENTION

Figure 1:
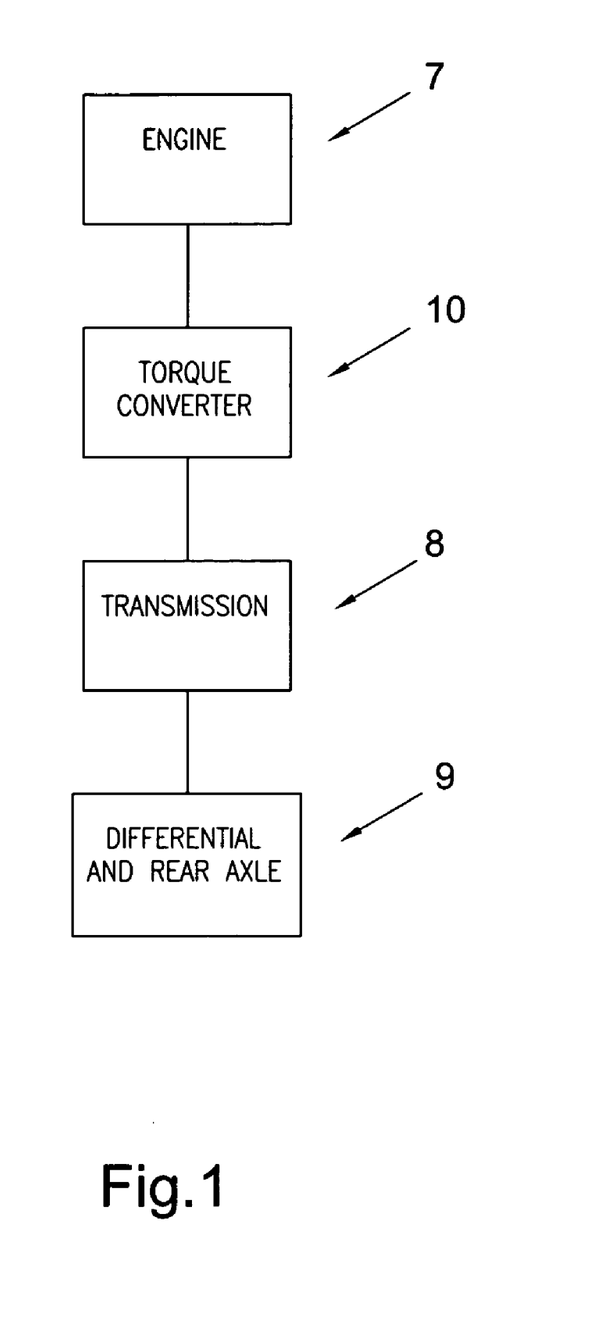
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
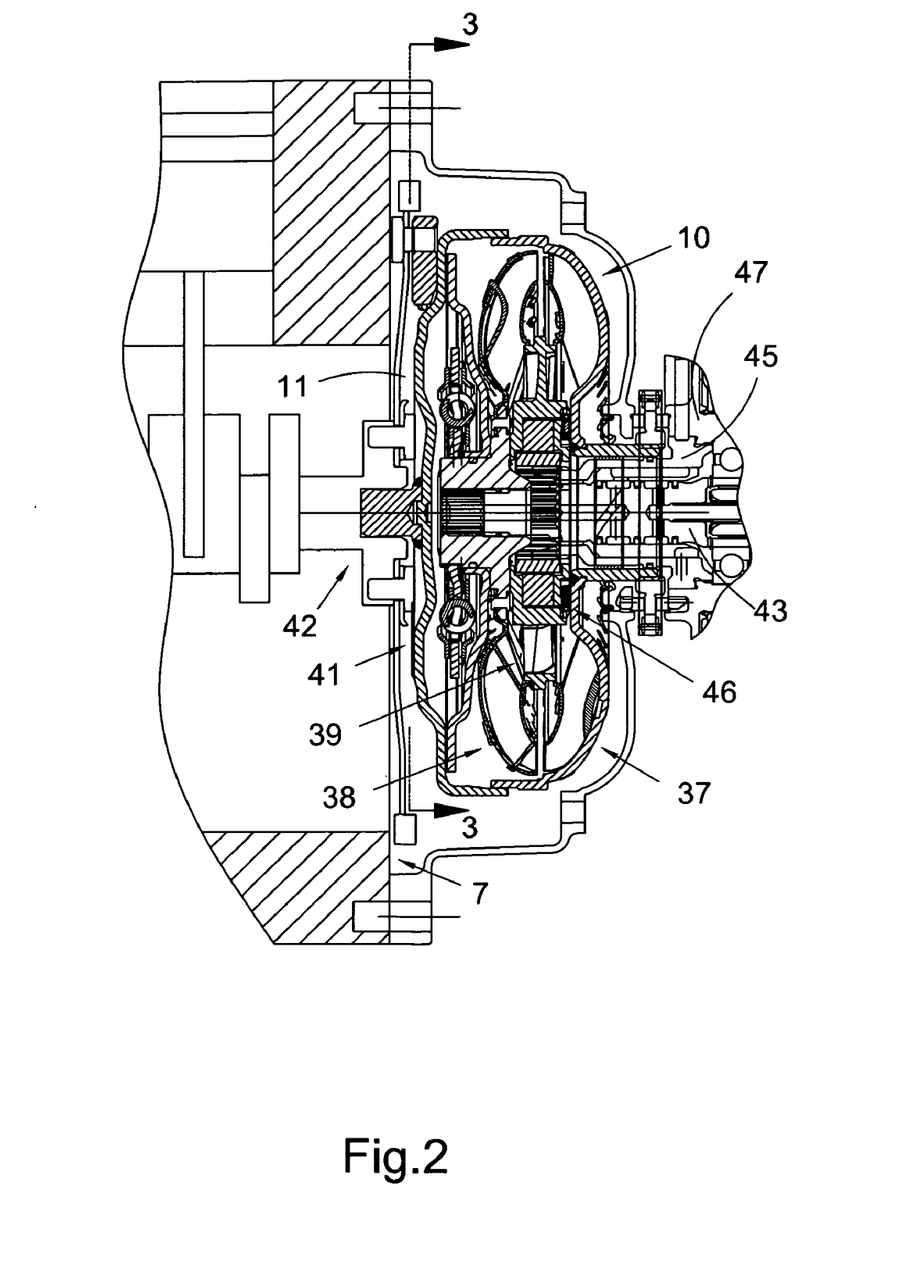
FIG. 2 is a cross-sectional view of a prior art torque converter, shown secured to an engine of a motor vehicle.
Figure 3:
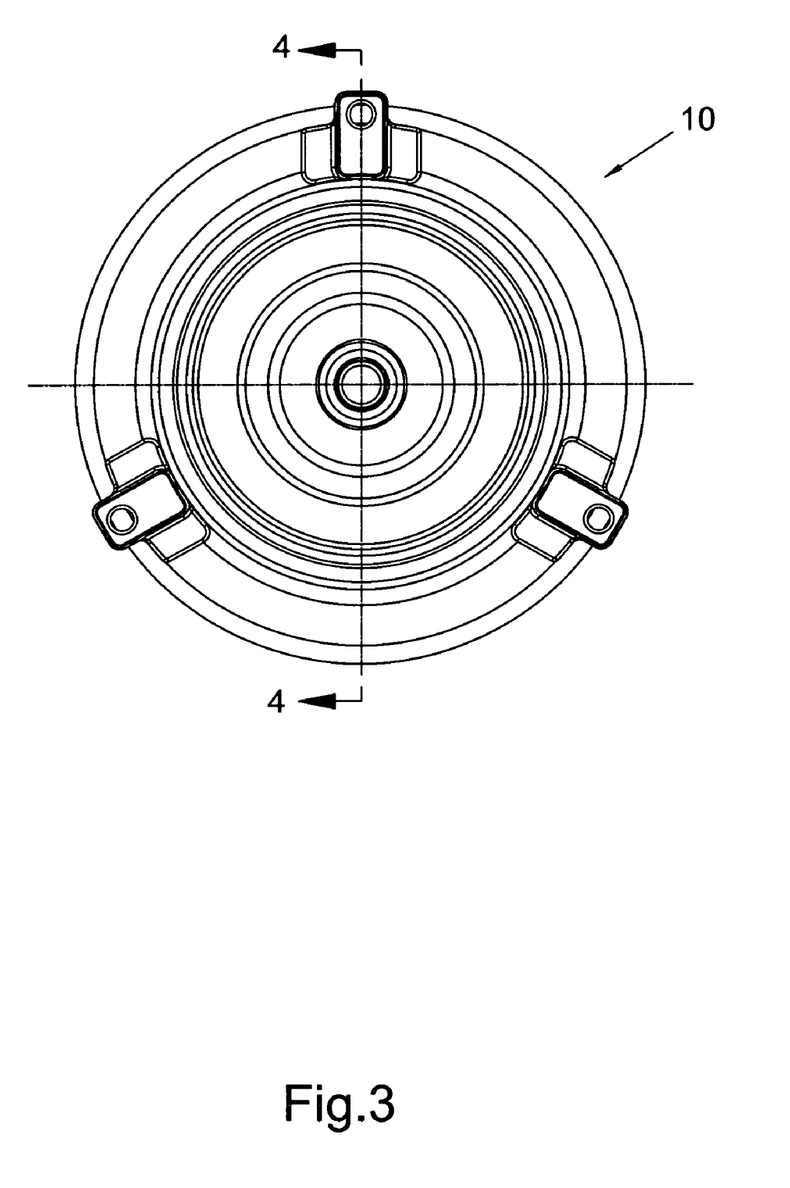
FIG. 3 is a left view of the torque converter shown in FIG. 2, taken generally along line 3-3 in FIG. 2.
Figure 4:
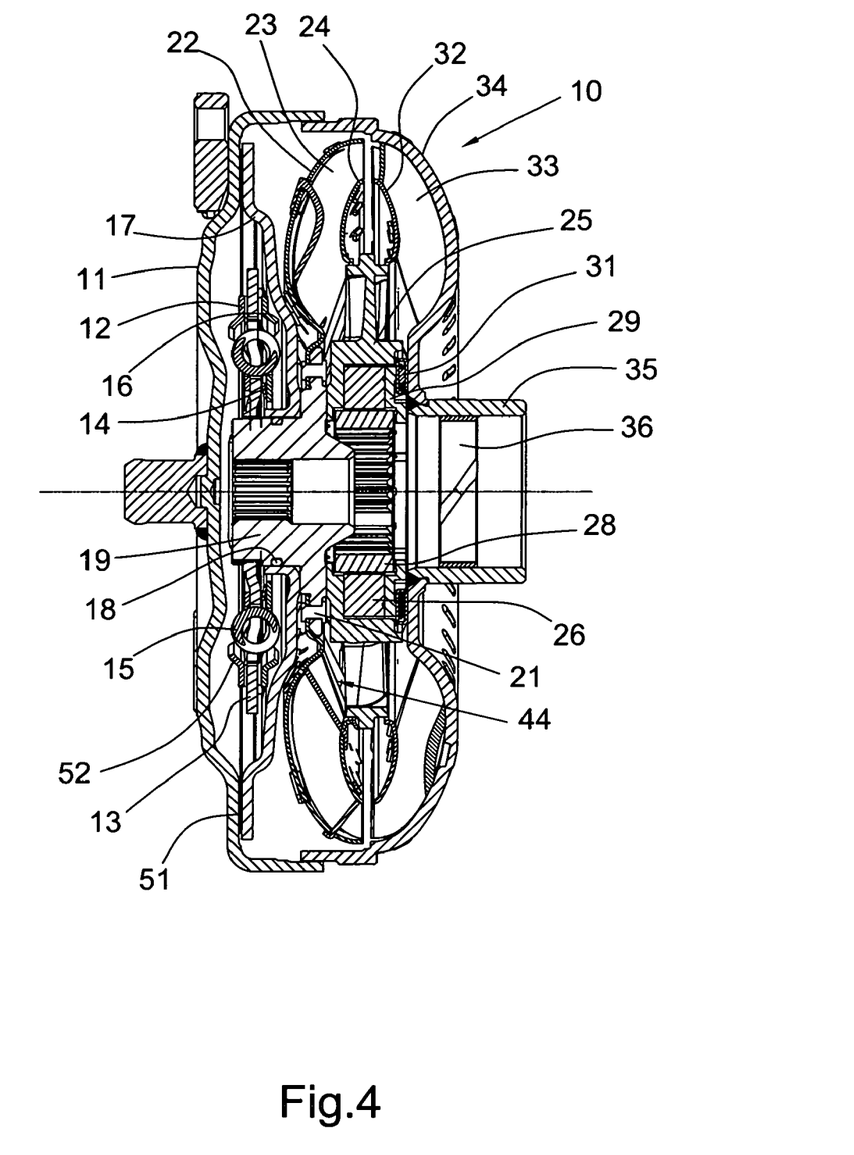
FIG. 4 is a cross-sectional view of the torque converter shown in FIGS. 2 and 3, taken generally along line 4-4 in FIG. 3.
Figure 5:
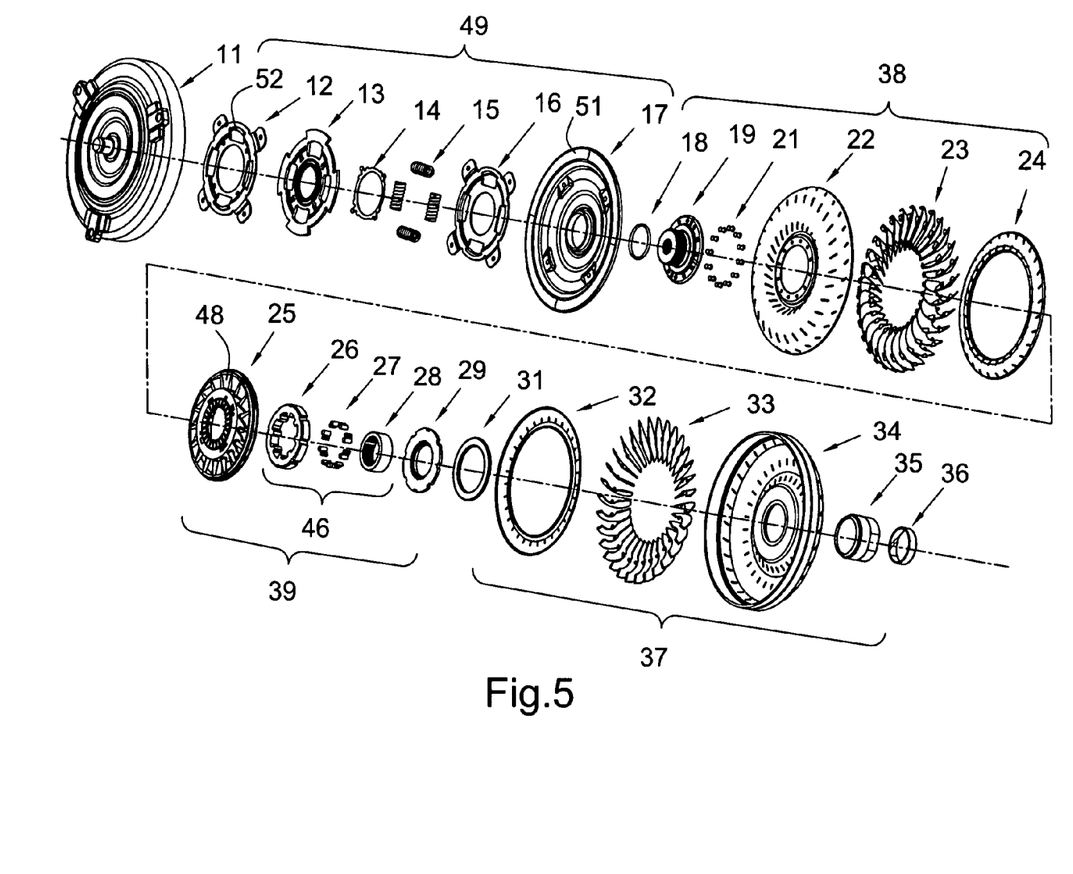
FIG. 5 is a first exploded view of the torque converter shown in FIG. 2, as shown from the perspective of one viewing the exploded torque converter from the left.
Figure 6:
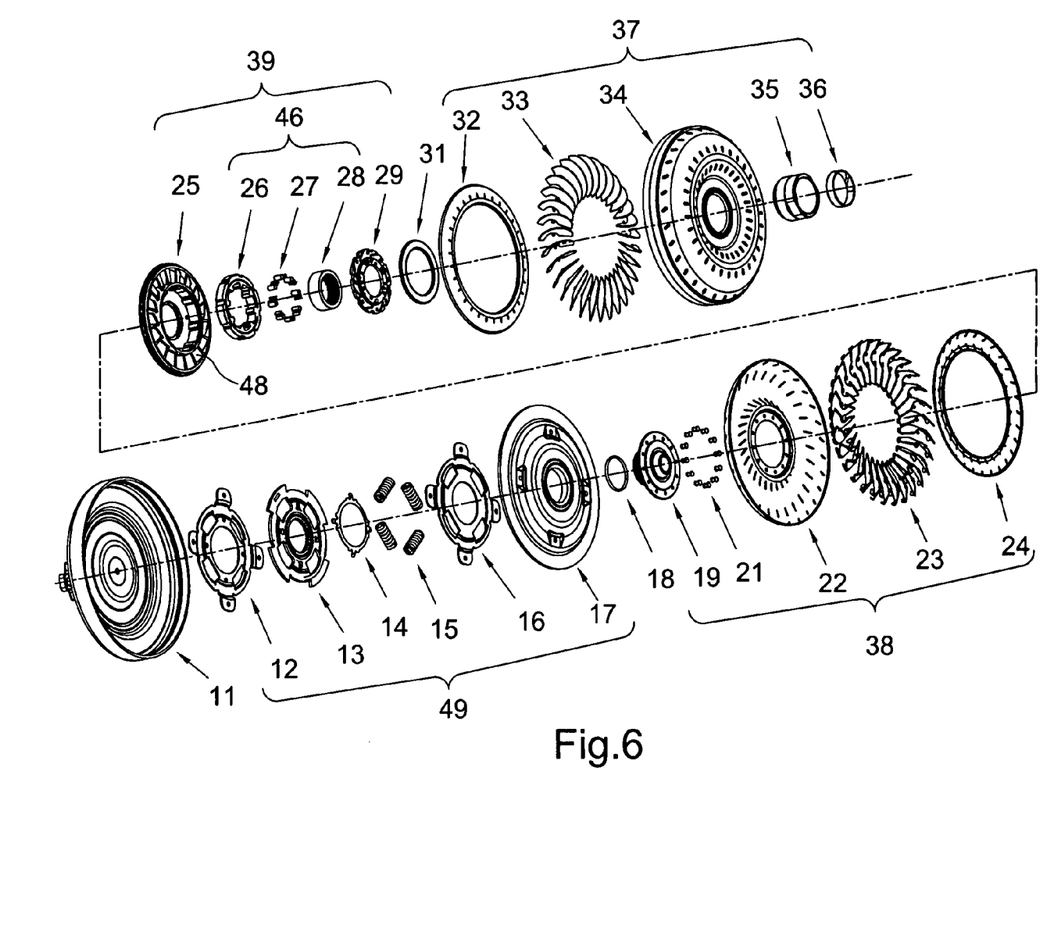
FIG. 6 is a second exploded view of the torque converter shown in FIG. 2, as shown from the perspective of one viewing the exploded torque converter from the right.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

One-piece blades in stators, for example, blades 48, are known. Two-piece stator blades also are known, for example, as described in commonly-owned, and therefore, uncitable, U.S. Provisional patent application Ser. No. 11/728,066, filed Mar. 23, 2007. It would be desirable to increase the stress bearing capacity of the blades in U.S. Provisional patent application Ser. No. 11/728,066 while maintaining other advantageous characteristics of the blades, for example, the flow patterns associated with usage of the blades.

Thus, there is a long-felt need for a stator having multi-segment blades with increased stress bearing capacity.

BRIEF SUMMARY OF THE INVENTION

The present invention broadly comprises a blade for a stator in a torque converter, including: a first blade segment connected to an inner circumferential section of the stator; at least one second blade segment, separately formed from the first blade segment, and connected to the inner circumferential section; and a third blade segment, separately formed from the first and at least one second blade segments, and connected to the inner circumferential section. In some aspects, the first, at least one second, and third blade segments include respective outer radial portions and the respective outer radial portions are fixedly connected. In some aspects, the first, at least one second, and third blade segments form a continuous surface. In some aspects, the first and at least one second blade segments are in contact and the at least one second and third blade segments are in contact. In some aspects, the first, at least one second, and third blade segments include respective edges and the first and at least one second blade segments are in contact along the respective edges and the at least one second and third blade segments are in contact along the respective edges. In some aspects, at least one of the respective edges is coined.

In some aspects, the at least one second blade segment is circumferentially and axially disposed between the first and third blade segments. In some aspects, the first, at least one second, and third blade segments are circumferentially and axially off-set. In some aspects, the at least one second blade segment includes a tab at an inner circumference and the tab bent is to contact one of the first and third blades and provide a predetermined spacing among the first, at least one second, and third blade segments. In some aspects, during operation of the stator, fluid pressure on the at least one second blade segment is less than respective fluid pressures on the first and third blade segments. In some aspects, at least one of the first, at least one second, or third blade segments is stamped or at least one of the first, at least one second, or third blade segments is cast.

The present invention also broadly comprises a blade for a stator in a torque converter, including: a first blade segment connected to an outer race of the stator and including a first edge and a first outer circumferential portion; a second blade segment, separately formed from the first blade segment, connected to the outer race, and including second and third edges and a second outer circumferential portion; and a third blade segment, separately formed from the first and second blade segments, connected to the outer race, and including a fourth edge and a third outer circumferential portion. The first and second and the third and fourth edges, respectively, are at least partially in contact, the first, second, and third outer circumferential portions are fixedly secured, and the outer race and the first, second, and third outer circumferential portions define an annular space for the stator.

The present invention further broadly comprises a blade for a stator in a torque converter, including: a first blade segment connected to an outer race of the stator and including a first outer circumferential portion; a second blade segment, separately formed from the first blade segment, connected to the outer race, and including a second outer circumferential portion; and a third blade segment, separately formed from the first and second blade segments, connected to the outer race, and including a third outer circumferential portion. The first, second, and third outer circumferential portions are fixedly secured one to the other and the first, second, and third blade segments are stamped.

It is a general object of the present invention to provide a multi-segment blade for a stator with increased stress-bearing capacity.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
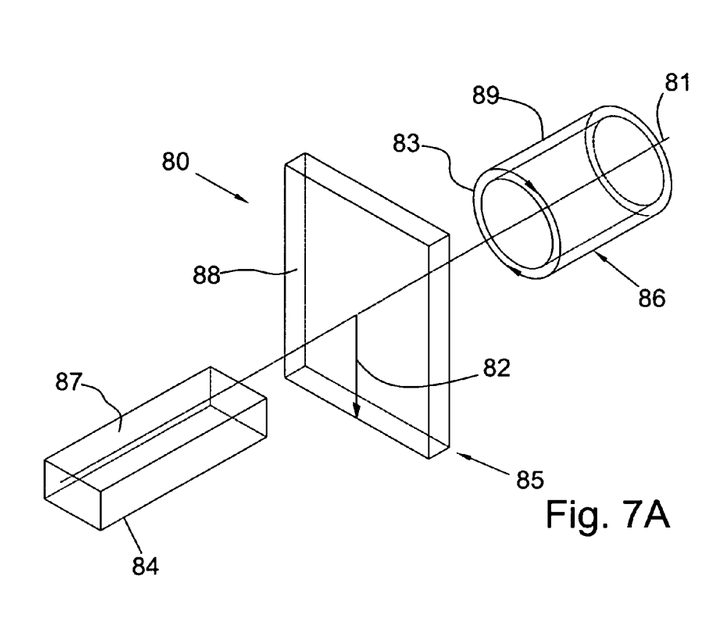
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
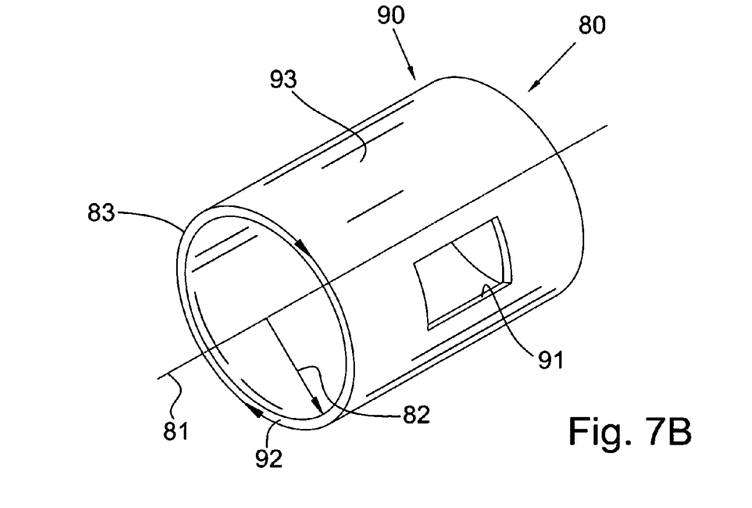
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
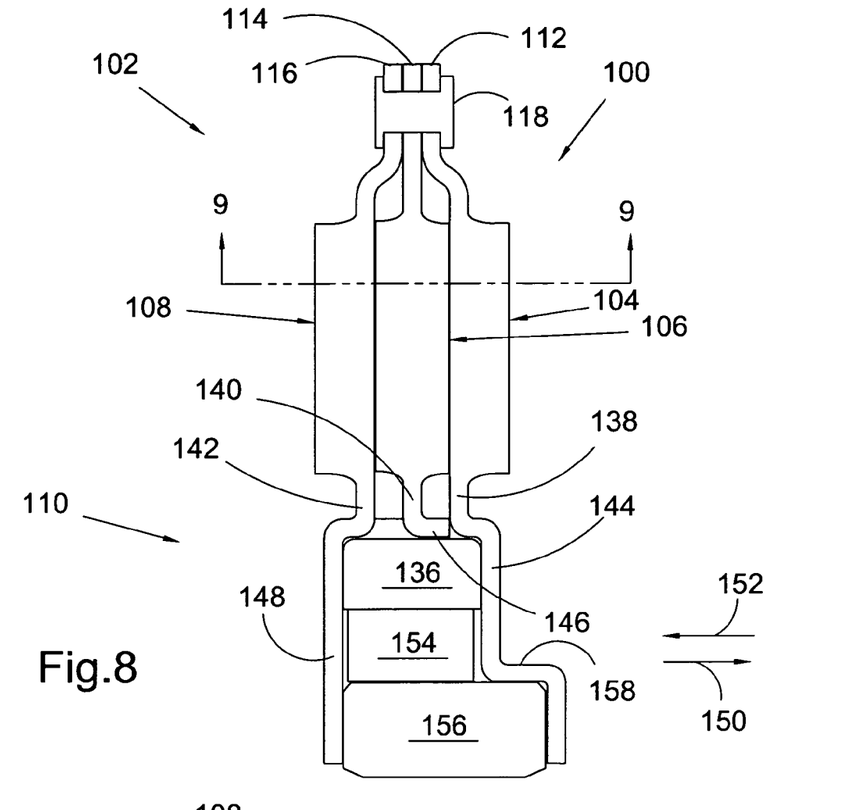
FIG. 8 is a partial cross-sectional view of a stator with a present invention three-part blade; and, FIG. 9 is a sectional view generally along line 9-9 in FIG. 8.

FIG. 8 is front perspective view of a stator with present invention three-part blade 100.

Figure 9:
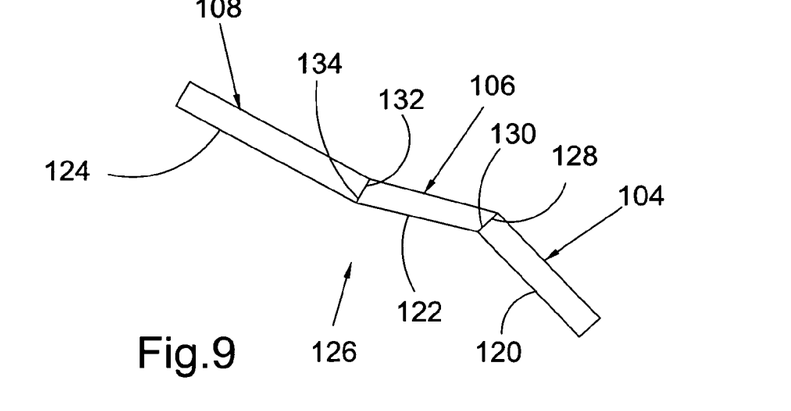

FIG. 9 is a top view generally along line 9-9 in FIG. 8. The following should be viewed in light of FIGS. 8 and 9. Blade 100 is shown in stator 102. It is understood that stator 102 includes a plurality of blades 100. It should be further understood that stator 102 is not limited to any particular number of blades 100. Blade 100 includes leading blade segment 104, at least one middle blade segment 106, and trailing blade segment 108. In some aspects, blade 100 includes a single middle blade segment 106. In some aspects (not shown), blade 100 includes more than one middle blade segment 106. Segments 104, 106, and 108 are separately formed. That is, segments 104, 106, and 108 are separate pieces that are configured as described infra to form blade 100. Thus, stator 102 is formed with "composite" blades 100 formed from three separate pieces or segments. The separate pieces or segments can be connected, joined, placed in contact, aligned, or configured as described infra. Segments 104, 106, and 108 are each connected to inner circumferential section 110 of the stator as further described infra. Segments 104, 106, and 108 include outer radial, or circumferential, portions 112, 114, and 116, respectively. The outer radial portions are fixedly connected by any means known in the art, for example, by rivet 118. Section 110 and the outer radial portions form an annular space for the stator.

Segment 106 is circumferentially and axially disposed between segments 104 and 108. Further, segments 104, 106, and 108 are circumferentially and axially off-set.

In some aspects, segments 104, 106, and 108 form a continuous surface. For example, surfaces 120, 122, and 124 of segments 104, 106, and 108, respectively, form a continuous surface 126 for the blade. In some aspects (not shown), the segments are configured to create gaps between the segments.

Segments 104, 106, and 108 can be configured in a variety of ways to form blade 100. In some aspects, the segments are in contact, for example, along respective edges. For example, segments 104 and 106 are in contact along radial edges 128 and 130, respectively, and segment 106 and 108 are in contact along radial edges 132 and 134, respectively. In some aspects, one or more of the radial edges is coined.

In some aspects, outer race 136 forms inner circumferential section 110 and segments 104, 106, and 108 are connected to outer race 136 by any means known in the art. In some aspects, inner circumferential portions 138, 140, and 142 of segments 104, 106, and 108, respectively, are formed into the race by tabs 144, 146, and 148, respectively. For example, splines or radial extensions (not shown) from outer race 136 are circumferentially interlocked with tabs 144 and 148 to lock blade 100 and the race. In some aspects (not shown), respective spline connections on the inner circumferential portions are used to connect the segments to the race. In some aspects, tab 146 is formed and installed to provide a desired, or predetermined, spacing between the blade segments, for example, an axial spacing. For example, tabs 146 are bent so as to align in an axial direction and contact one of segments 104 or 108. In these aspects, tabs 146 are bent in opposite axial directions for each successive blade. For example, tab 146 is bent in direction 150 for one blade 100 and for an adjacent blade 100 in the stator, tab 146 is bent in direction 152. In some aspects, race 136 transfers torque from blade 100 through rollers 154 and inner race 156 to a stator shaft (not shown) for a transmission (not shown). In some aspects, the stator is radially centered by axial portion 158 of tab 144 and corresponding portions of the outer race. It should be understood that blade 100 can be used with other types and configurations of stators and one-way clutches.

Segments 104, 106, and 108 can be made using any means known in the art. For example, the segments can be formed by stamping or casting. Combinations of fabricating means can be used together.

In some aspects, the respective cross section of each blade segment 104, 106, and 108 at the respective inner circumferential portion (the area of highest torsional stress when stator 102 is in operation) is approximately equal to the equivalent cross section of a blade section disclosed in U.S. Provisional patent application Ser. No. 11/728,066. Thus, in these aspects, the torque bearing capacity of blade 100 is approximately 50% greater than the torque bearing capacity of the blade disclosed in U.S. Provisional patent application Ser. No. 11/728,066. The configuration of the blade disclosed in U.S. Provisional patent application Ser. No. 11/728,066 causes a void in the fluid flow past the blade when a stator using the blade is in operation. The placement of middle segment 106 approximates the shape of the void noted supra; therefore, the flow pattern associated with the blade disclosed in U.S. Provisional patent application Ser. No. 11/728,066 and flow pattern associated with blade 100 are similar. Alternately stated, when stator 102 is in operation, fluid pressure on segment 106 is less than respective fluid pressures on blades 104 and 108. Thus, segment 106 provides increased torque bearing capacity while preserving the flow pattern for the blade disclosed in U.S. Provisional patent application Ser. No. 11/728,066.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A blade for a stator in a torque converter, comprising:
   a first blade segment connected to an inner circumferential section of the stator;
   at least one second blade segment, separately formed from the first blade segment, and connected to the inner circumferential section; and,
   a third blade segment, separately formed from the first and at least one second blade segments, and connected to the inner circumferential section, wherein the at least one second blade segment includes a tab at an inner circumference and wherein the tab bent to contact one of the first or third blades and provide a predetermined spacing among the first, at least one second, and third blade segments.

2. The blade of claim 1 wherein the first, at least one second, and third blade segments include respective outer radial portions and wherein the respective outer radial portions are fixedly connected.

3. The blade of claim 1 wherein the first, at least one second, and third blade segments form a continuous surface.

4. The blade of claim 1 wherein the first and at least one second blade segments are in contact and the at least one second and third blade segments are in contact.

5. The blade of claim 4 wherein the first, at least one second, and third blade segments include respective edges and wherein the first and at least one second blade segments are in contact along the respective edges and the at least one second and third blade segments are in contact along the respective edges.

6. The blade of claim 5 wherein at least one of the respective edges is coined.

7. The blade of claim 1 wherein the at least one second blade segment is circumferentially and axially disposed between the first and third blade segments.

8. The blade of claim 1 wherein the first, at least one second, and third blade segments are circumferentially and axially off-set.

9. The blade of claim 1 wherein at least one of the first, at least one second, and third blade segments is stamped.

10. The blade of claim 1 wherein at least one of the first, at least one second, and third blade segments is cast.

11. The blade of claim 1 wherein during operation of the stator, fluid pressure on the at least one second blade segment is less than respective fluid pressures on the first and third blade segments.

12. A blade for a stator in a torque converter, comprising:
    a first blade segment connected to an outer race of the stator and including a first edge and a first outer circumferential portion;
    a second blade segment, separately formed from the first blade segment, connected to the outer race, and including second and third edges and a second outer circumferential portion; and,
    a third blade segment, separately formed from the first and second blade segments, connected to the outer race, and including a fourth edge and a third outer circumferential portion, wherein the first and second and the third and fourth edges, respectively, are at least partially in contact, wherein the first, second, and third outer circumferential portions are fixedly secured, and wherein the outer race and the first, second, and third outer circumferential portions define an annular space for the stator.

13. A a stator in a torque converter, comprising:
    a blade including:
       a first blade segment, including a first piece of material, connected to an outer race of the stator and including a first outer circumferential portion;
       a second blade segment, including a second piece of material different from the first piece of material, connected to the outer race, and including a second outer circumferential portion; and,
       a third blade segment, including a third piece of material different from the first and second pieces of material; and,
    inner and outer race aligned in a radial direction, wherein:
       the first, second, and third outer circumferential portions are fixedly secured one to the other;
       the second blade segment is wholly aligned with the inner and outer races in the radial direction;
       the first and third blade segments are at least partially aligned with the inner and outer races in the radial direction; and,
       the first, second, and third blade segments are stamped.

* * * * *